US009641971B2

(12) United States Patent
Eda et al.

(10) Patent No.: US 9,641,971 B2
(45) Date of Patent: May 2, 2017

(54) GEO-FENCING AWARE SEPARATION OF COMPUTE INFRASTRUCTURE BUILT WITHIN A GEOGRAPHICALLY LOCATED STORAGE DEVICE

(71) Applicant: International Business Machines Corporation, Armonk, NY (US)

(72) Inventors: Sasikanth Eda, Vijayawada (IN); Dean Hildebrand, Bellingham, WA (US); Varun Mittal, Zirakpur (IN); William W. Owen, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 14/620,717

(22) Filed: Feb. 12, 2015

(65) Prior Publication Data
US 2016/0241995 A1 Aug. 18, 2016

(51) Int. Cl.
H04W 24/00 (2009.01)
H04W 4/02 (2009.01)

(52) U.S. Cl.
CPC .................................. H04W 4/021 (2013.01)

(58) Field of Classification Search
None
See application file for complete search history.

(56) References Cited

U.S. PATENT DOCUMENTS

| 8,095,656 B2 | 1/2012 | McCormack |
| 8,656,454 B2 | 2/2014 | Gunawardena et al. |
| 8,676,593 B2 | 3/2014 | Nagpal et al. |
| 8,682,955 B1 | 3/2014 | Monden et al. |
| 8,775,485 B1 | 7/2014 | Cavage et al. |

(Continued)

OTHER PUBLICATIONS

"Data governance for grographical information systems", IBM Corporation, Thought Leadership White Paper, http://www.spotonsystems.com/Portals/11670/docs/ibm_white_paper_data_governance_for_gis.pdf, Jun. 2010, 20 pages.
Andrews, Chris, "Made in IBM Labs: Governing Geographically Dispersed Cloud Data", IBM Corporation, Press Release, http://www-03.ibm.com/press/us/en/pressrelease/44548.wss, Aug. 8, 2014, 2 pages.

(Continued)

*Primary Examiner* — Idowu O Osifade
(74) *Attorney, Agent, or Firm* — Francis Lammes; Stephen J. Walder, Jr.; Randall J. Bluestone

(57) ABSTRACT

A mechanism is provided for enabling separation of compute infrastructure built within a geographically located storage device. A determination is made as to whether a compute request originates from a geographical location that is the same as a geographical location of the geographically located storage device. Responsive to the compute request originating from a geographical location different from the geographical location of the geographically located storage device, a determination is made as to whether the compute request complies with governing requirements that govern the geographically located storage device. Responsive to the compute request complying with the requirements that govern the geographically located storage device, a determination is made as to whether the compute request is for data retrieval only. Responsive to the compute request being for data retrieval only, the requested data is gathered from data storage of the geographically located storage device and sent to a requesting client.

20 Claims, 7 Drawing Sheets

(56) References Cited

U.S. PATENT DOCUMENTS

| | | | |
|---|---|---|---|
| 2009/0083837 A1* | 3/2009 | Ishii | H04L 63/10 |
| | | | 726/4 |
| 2012/0272025 A1 | 10/2012 | Park et al. | |
| 2012/0284322 A1 | 11/2012 | Laborczfalvi et al. | |
| 2012/0303776 A1 | 11/2012 | Ferris | |
| 2014/0122441 A1 | 5/2014 | Vervaet et al. | |
| 2014/0129557 A1 | 5/2014 | Rahnama | |
| 2014/0188804 A1 | 7/2014 | Gokhale et al. | |
| 2016/0080929 A1* | 3/2016 | Reshef | H04W 8/183 |
| | | | 455/418 |

OTHER PUBLICATIONS

Burt, Jeffrey, "IBM Looking to 'Storlets' to Manage Object Storage", eWEEK, ww.eweek.com/storage/ibm-looking-to-storlets-to-manage-object-storage-html, May 15, 2014, 5 pages.

Hodge, Anna, "The Geographic Governance of Data Over Clouds", Building a Smarter Planet. A Smarter Planet Blog., http://asmarterplanet.com/blog/2014/08/data-governance.html, Aug. 8, 2014, 17 pages.

Wuchner, Tobias et al., "Compliance-preserving Cloud Storage Federation based on Data-driven Usage Control", Proceedings of the 2013 IEEE International Conference on Cloud Computing Technology and Science (CloudCom'13)—vol. 02, http://www.aifb.kit.edu/images/b/be/CloudCom2013-Compliance-preserving_federation.pdf, Dec. 2-5, 2013, 4 pages.

* cited by examiner

GEO-FENCING AWARE SEPARATION OF COMPUTE INFRASTRUCTURE BUILT WITHIN A GEOGRAPHICALLY LOCATED STORAGE DEVICE

BACKGROUND

The present application relates generally to an improved data processing apparatus and method and more specifically to mechanisms for geo-fencing aware compute infrastructure.

In today's global system of interconnected computer networks, Information Technology (IT) has become hugely dependent on data and ensuring each entities compliance, auditing, and security in terms of data placement, maintenance, separation in compute analysis, and the like, with respect to the entity's respective origin or location as well as any laws that govern the infrastructure at that location within a geographically distributed object storage namespace.

Traditionally, object storage is used for backup, archival, data mining, searching, search, analytics, and the like. This unstructured or raw data resides in the data storage for a much longer tenure of period when compared with traditional compute infrastructures. FIG. 1 depicts an example of a traditional object storage architecture. Traditional object storage architecture 100 comprises two geographically diverse infrastructures 102 and 112 that are accessible by client devices 120 and 122 via load balancer 124. Each of infrastructures 102 and 112 further comprise two node groups. The first node groups 104 and 114 comprise proxy nodes 104a-104n and 114a-114n that are used for distributed load handling/request handling from client devices 120 and 122 into the storage namespace. The second node groups 106 and 116, i.e. the storage namespace, comprises storage nodes 106a-106n and 116a-116n that are responsible for writing to the disks or storage subsystems and, in this illustrative architecture, purely serves as a storage unit repository. However, in order to analyze or extract any meaningful information from raw data retrieved from the storage nodes 106a-106n and 116a-116n in second node groups 106 and 116, the data must be sent back to client 120 and 122 or to an additional client 126 or compute node 128 for analysis.

With the evolution of embedded compute infrastructures with built-in object storage architecture, computation utilizing the data stored in these compute infrastructures is offloaded to storage units instead of using a traditional client device for computation purposes. FIG. 2 depicts an example of an embedded compute engine in an object storage architecture. As with the architecture shown in FIG. 1, embedded compute engine object storage architecture 200 of FIG. 2 comprises two geographically diverse infrastructures 202 and 212 that are accessible by client devices 220 and 222 via load balancer 224. Each of infrastructures 202 and 212 further comprise two node groups. The first node groups 204 and 214 comprise proxy nodes 204a-204n and 214a-214n that are used for distributed load handling/request handling from client devices 220 and 222 into the storage namespace. The second node groups 206 and 216, i.e. the storage namespace, comprises storage nodes 206a-206n and 216a-216n that are responsible for writing to the disks or storage subsystems.

However, in addition to the common infrastructure, embedded compute engine object storage architecture 200 also comprises software engines 208 and 218 as shown within second node groups 206 and 216, respectively. In an alternative embodiment, software engines 208 and 218 may reside within first node groups 204 and 214. Utilizing software engines 208 and 218, any computation or analysis required by client device 220 or 222 may be implemented by software engine 208 or 218. However, a user of client devices 220 and 222 has to frame computation algorithm to perform the computation or analysis and has to deploy or pass the computation algorithm to software engine 208 or 218 at the time of the original request. Then software engine 208 or 218 sends the results of the computation back to the requesting user of client device 220 or 222. Therefore, embedded compute engine object storage architecture 200 differs from the traditional object storage architecture 100 of FIG. 1 in that, embedded compute engine object storage architecture 200 does not require any additional client or compute node to perform computation or analysis of the data. That is, second node groups 206 and 216 act as compute nodes and return any results back to the user.

However, with the embedded compute engine object storage architecture of FIG. 2, a scenario may exist where in a storage namespace is shared by two countries having different laws, policies, or the like, and where the data residing in the storage namespace is governed according to the respective countries laws, policies, and or the like where the storage namespace resides. While the two countries may have a treaty indicating a sharing of the data residing in the storage namespace for a combined project, such a treaty would prohibit any computational algorithms from being executed by a software engine at the same geographical location associated with the storage namespace. That is, only the data may be utilized by both the countries and any country accessing the storage namespace outside of the namespace's geographic location may not perform any analysis or computation utilizing computational algorithms using the software engine at the same geographical location associated with the storage namespace.

In this scenario, there exists a problem in terms of having separation in compute infrastructure, i.e. storage nodes itself are acting as compute infrastructure, as there exists no way to govern the compute algorithm owned by a country to be limited only to that particular country but not be deployed on to the shared compute infrastructure embedded in the object storage. Therefore, such offloading of computation to storage units results in a security concern, where computation analysis algorithms may not be secured in order to adhere with respective policies and/or laws associated with the countries where the geographically diverse infrastructures in which the software engines reside. Instead, the computation analysis algorithms are shared with various countries utilizing the same storage unit/namespace, which prevents compute resource separation between different countries sharing the same storage unit/namespace.

SUMMARY

In one illustrative embodiment, a method, in a data processing system, is provided for enabling separation of compute infrastructure built within a geographically located storage device. The illustrative embodiment determines whether a compute request originates from a geographical location that is the same as a geographical location of the geographically located storage device. The illustrative embodiment determines whether the compute request complies with governing requirements that govern the geographically located storage device in response to the compute request originating from a geographical location different from the geographical location of the geographically located storage device. The illustrative embodiment determines whether the compute request is for data retrieval only in response to the compute request complying with the requirements that govern the geographically located storage device. The illustrative embodiment gathers the requested data from a data storage of the geographically located storage device in response to the compute request being for data retrieval only. The illustrative embodiment sends the retrieved data to a requesting client.

Thus, the illustrative embodiment allows a compute request for data only to be processed so long as the governing requirements associated with the geographically located storage device indicate the compute request is compliant. That is, in the illustrative embodiment, the governing requirements are at least one of policies implemented for the geographical location of the geographically located storage device, laws of a country where the geographically located storage device resides, or agreements between the country where the geographically located storage device resides and at least one other country. Therefore, if the compute request complies with the policies, laws, and/or agreements, the request for data only is processed.

Additionally, the illustrative embodiment determines whether the compute request is for data and computation offloading in response to the compute request failing to be for data retrieval only. The illustrative embodiment gathers the requested data from the data storage of the geographically located storage device in response to the compute request being for data and computation offloading. The illustrative embodiment sends the retrieved data and a computational algorithm included with the compute request to a computation device separate from the geographically located storage device. In the illustrative embodiment, the computation device separate from the geographically located storage device is at least one of the requesting client, another identified client, or a computation node. Again, the illustrative embodiment allows a compute request for data and computation offloading to be processed so long as the governing requirements associated with the geographically located storage device indicates the compute request is compliant. Therefore, if the compute request complies with the policies, laws, and/or agreements, the request for data only is processed.

The illustrative embodiment determines whether the compute request is for data and computation offloading in response to the compute request failing to be for data retrieval only. The illustrative embodiment recognizes that the compute request is for analysis or computation utilizing the embedded computational infrastructure of the geographically located storage device in response to the compute request failing to be for data and computation offloading. The illustrative embodiment gathers the requested data from the data storage of the geographically located storage device. The illustrative embodiment performs requested analysis or computation identified in the compute request utilizing an included computation algorithm and the embedded computational infrastructure of the geographically located storage device. The illustrative embodiment sends results of the analysis or the computation to the requesting client. Again, the illustrative embodiment allows a compute request for analysis or computation utilizing the embedded computational infrastructure of the geographically located storage device to be processed so long as the governing requirements associated with the geographically located storage device indicates the compute request is compliant. Therefore, if the compute request complies with the policies, laws, and/or agreements, the request for data only is processed.

The illustrative embodiment determines whether the governing requirements indicate that, for non-geographically originating compute requests, any trace of the analysis or computation performed on the geographically located storage device is to be removed. The illustrative embodiment removes any residue of the compute request, performs computations, and results of the computation existing on the geographically located storage device in response to the governing requirements indicating that any trace of the analysis or computation performed on the geographically located storage device is to be removed. Therefore, the illustrative embodiment provides protection of the geographically located storage device based on the policies, laws, and/or agreements of the governing requirements such that the computation algorithm is not visible to the other geographic users, that results of the computation are hidden from all logs, and audits the storage node so that any residue of the request, the computations, or results of the computation are deleted from the storage node once the results are sent back to the requesting entity.

In the illustrative embodiment, the compute request is received and passed by the illustrative embodiment determining whether the incoming compute request is an authorized access to the geographically located storage device by comparing metadata associated with the compute request against a set of verified authorization information and passing the compute request to the geo-fencing policy implementation module in response to authenticating the compute request.

In the illustrative embodiment, the metadata associated with the compute request is at least one of geographical location (country of origin), company or enterprise, client device, or user identification.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
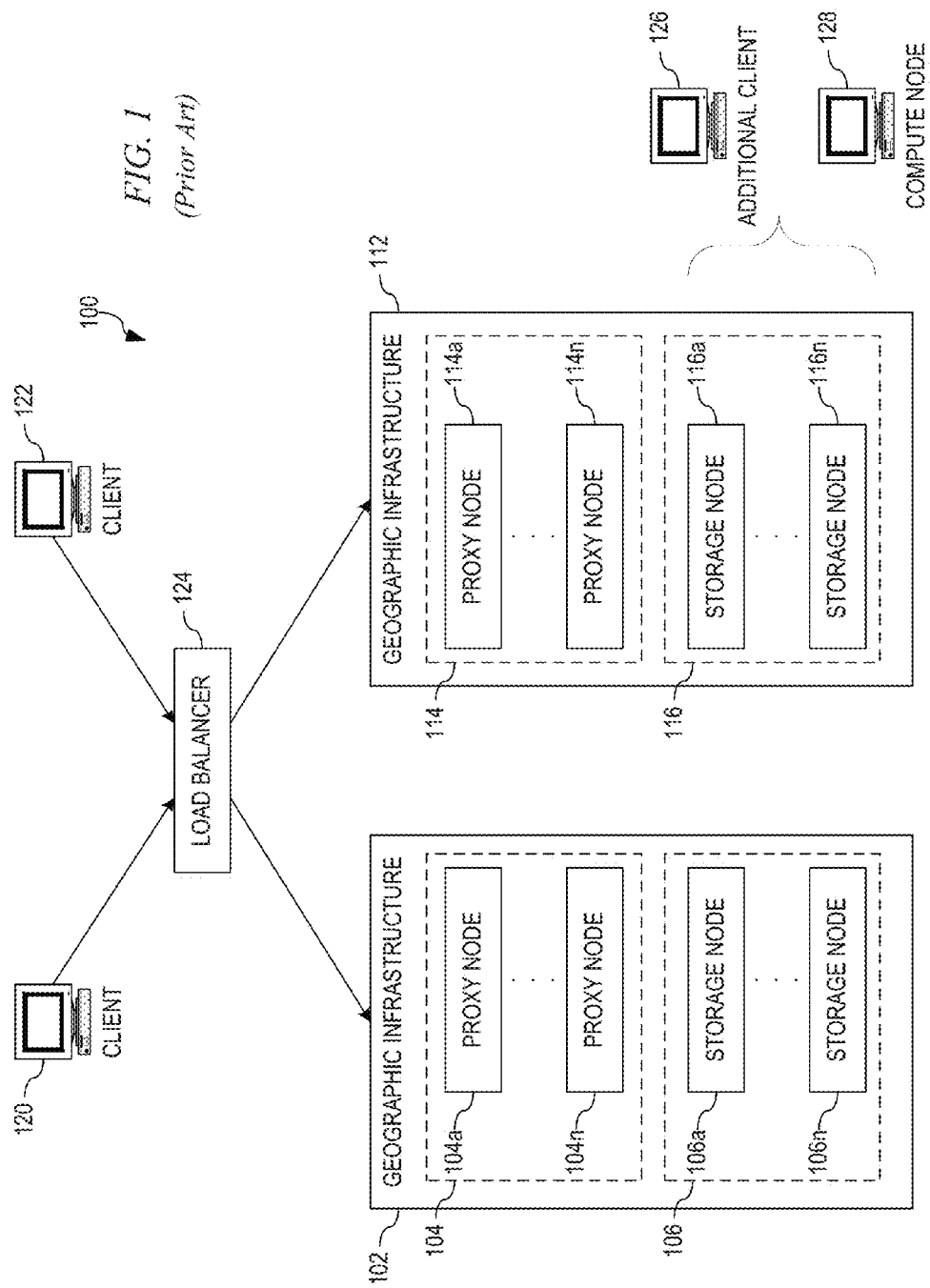
FIG. 1 depicts an example of a traditional object storage architecture.
Figure 2:
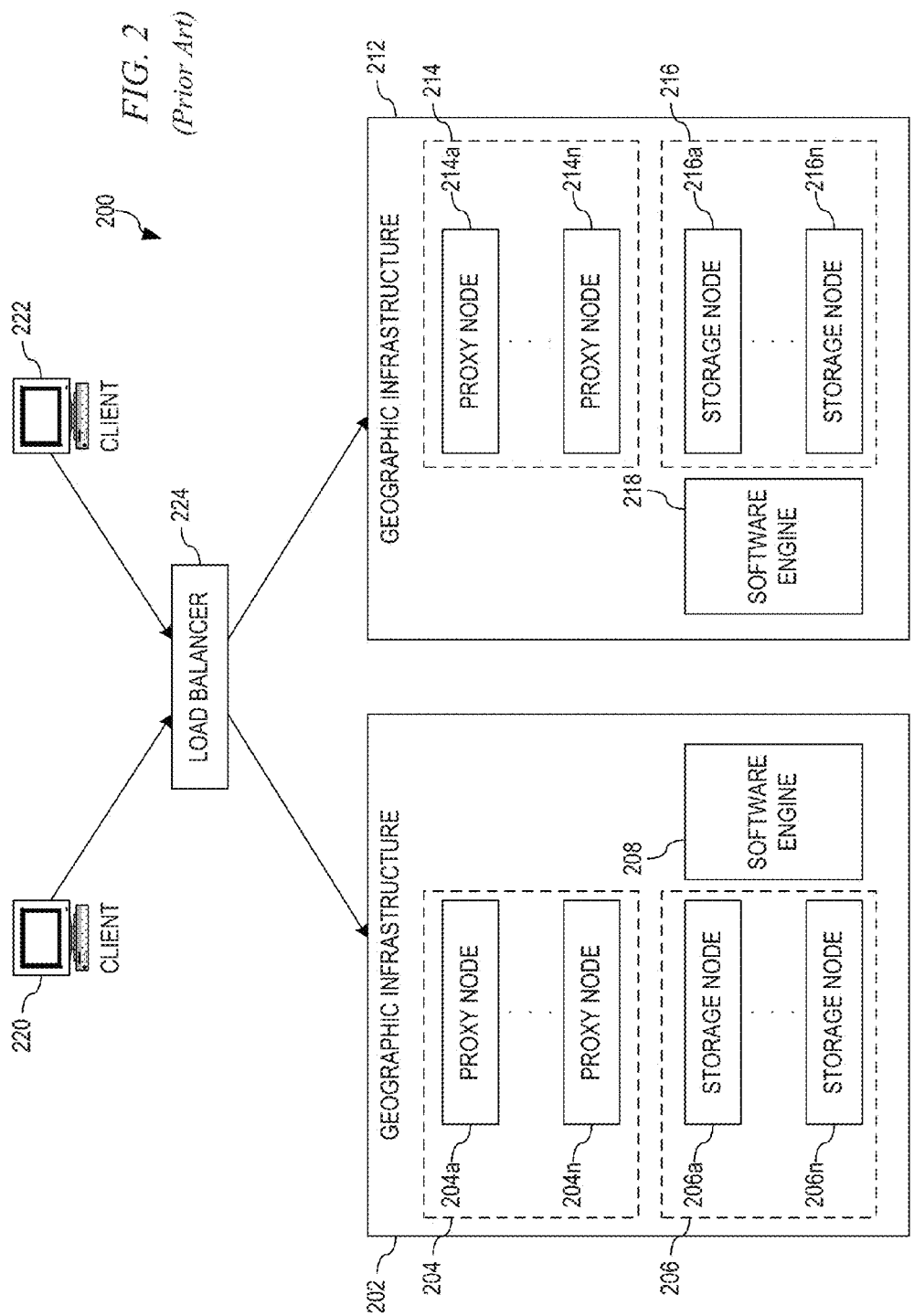
FIG. 2 depicts an example of an embedded compute engine in an object storage architecture.

The illustrative embodiments provide a geo-fencing aware compute mechanism that enables separation of compute infrastructure built within a storage unit that helps govern computing algorithms that extract a particular set of information from a large set of raw data on a storage node owned by a country, such that such computing algorithms to extract such information may only be executed according to the policies, laws, agreements, or the like, which may referred to as governing requirements hereafter, associated with that particular country. The geo-fencing aware compute mechanism also provides hardened security through maintenance, access limitations, or the like, of the compute algorithm and common object storage compute layers as per the governing requirements as noted by administrators or business requirements.

For example, in one embodiment, if a request bearing a computation algorithm that requires data, objects, metadata, attributes, or the like, originates from a particular geographic location and is served by the storage node located or designated for that respective location, the geo-fencing aware compute mechanism allows the computation to be offloaded to the storage unit and provides the results of the computation to the user. In another embodiment, if a request bearing a computation algorithm requires data, objects, metadata, attributes, or the like, originates from a particular geographical location and requires shared data of a storage nodes located in another location or governed by a different policy, the geo-fencing aware compute mechanism discards the computation request and responds with an error indicating that the computational algorithm is incapable of being executed due to the governing requirements and/or that insufficient permissions exist to use the embedded compute infrastructure of the storage node. In yet another embodiment, if the embedded compute infrastructure owned by the multiple countries but governed by the geographical policies of a particular country not responsible for the request share their respective compute infrastructure but not the compute algorithms, the geo-fencing aware compute mechanism allows the computation request and, thus, the computational algorithm to be executed by the software engine and compute infrastructure of the storage node bearing the data, objects, metadata, attributes, or the like. However, the geo-fencing aware compute mechanism sets the software engine and compute infrastructure of the storage node such that the computation algorithm is not visible to the other geographic users, that results of the computation are hidden from all logs, and audits the storage node so that any residue of the request, the computations, or results of the computation are deleted from the storage node once the results are sent back to the requesting entity.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 3:
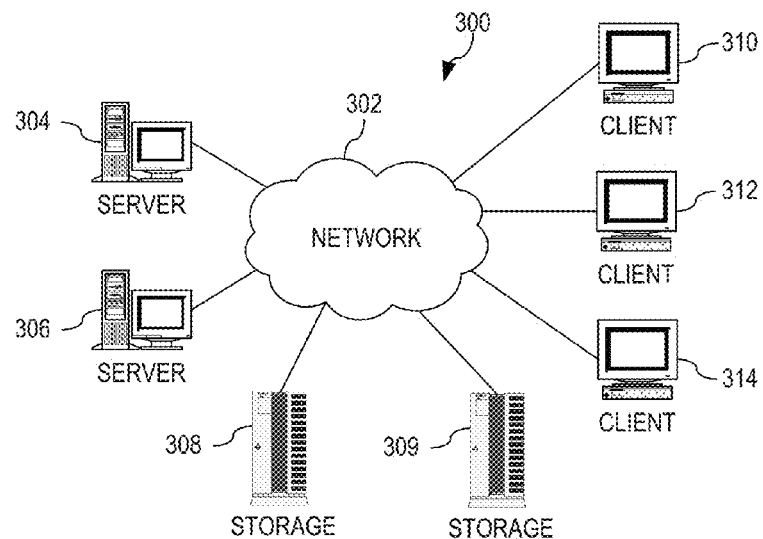
FIG. 3 is an example diagram of a distributed data processing system in which aspects of the illustrative embodiments may be implemented.
Figure 4:
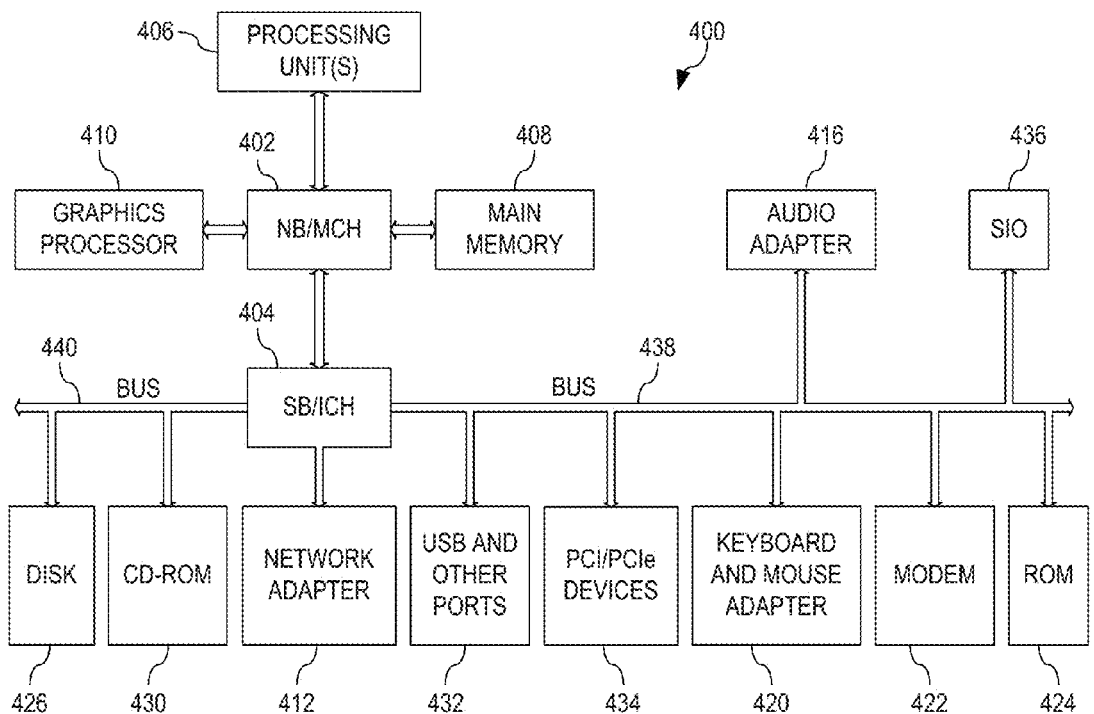
FIG. 4 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 3 and 4 are provided hereafter as example environments in which aspects of the illustrative embodiments may be implemented. It should be appreciated that FIGS. 3 and 4 are only examples and are not intended to assert or imply any limitation with regard to the environments in which aspects or embodiments of the present invention may be implemented. Many modifications to the depicted environments may be made without departing from the spirit and scope of the present invention.

FIG. 3 depicts a pictorial representation of an example distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 308 and storage unit 309. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 300 may also be implemented to include a number of different types of networks, such as for example, an intranet, a local area network (LAN), a wide area network (WAN), or the like. As stated above. FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

FIG. 4 is a block diagram of an example data processing system in which aspects of the illustrative embodiments may be implemented. Data processing system 400 is an example of a computer, such as server 304, storage unit 308, and client 310 in FIG. 3, in which computer usable code or instructions implementing the processes for illustrative embodiments of the present invention may be located.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 400.

As a server, data processing system 400 may be, for example, an IBM eServer™ System P® computer system, Power™ processor based computer system, or the like, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
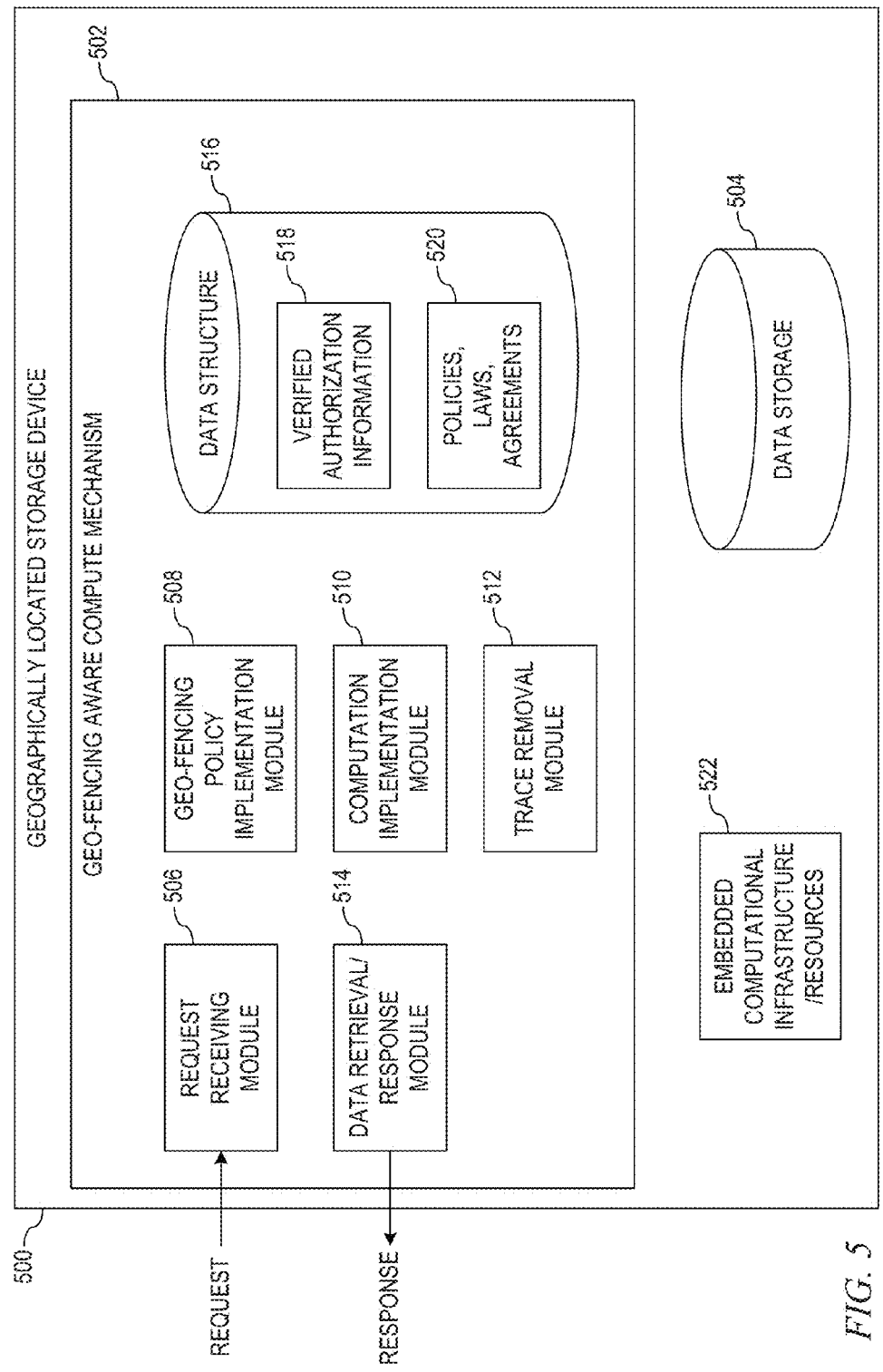
FIG. 5 depicts a functional block diagram of a geo-fencing aware compute mechanism that enables separation of compute infrastructure built within a storage unit in accordance with one illustrative embodiment.

FIG. 5 depicts a functional block diagram of a geo-fencing aware compute mechanism that enables separation of compute infrastructure built within a storage unit in accordance with one illustrative embodiment. Geographically located storage device 500 is an example of a storage unit, such as storage unit 308 in FIG. 3. Geographically located storage device 500 comprises geo-fencing aware compute mechanism 502 and data storage 504. Geo-fencing aware compute mechanism 502, which enables separation of compute infrastructure built within a storage unit, comprises request receiving module 506, geo-fencing policy implementation module 508, computation implementation module 510, trace removal module 512, and data retrieval/response module 514. In operation, request receiving module 506 receives a compute request from a user. In accordance with the illustrative embodiments, the compute request may originate from any client device that has access to geographically located storage device 500. However, since geographically located storage device 500 is a storage device that is shared by two or more countries under a prearranged agreement, request receiving module 506 performs an initial check of each incoming compute request as to an authorized access to geographically located storage device 500. In performing this check, request receiving module 506 compares metadata associated with the compute request that indicates geographical location (country of origin), company or enterprise, client device, user identification, or any other authorization information against already verified authorization information 518 in data structure 516 to ensure only those individuals who are to have access to geographically located storage device 500 have their compute requests processed in geographically located storage device 500. Therefore, if request receiving module 506 fails to authorize the incoming compute request, request receiving module 506 rejects the compute request and sends an error to the requesting user indicating insufficient permissions to use geographically located storage device 500. However, if request receiving module 506 authorizes the incoming compute request, request receiving module 506 passes the compute request to geo-fencing policy implementation module 508.

Upon receiving the compute request, geo-fencing policy implementation module 508 determines whether the geographical location information associated with the compute request is the same as the geographical location of geographically located storage device 500. If the compute request originates from a geographical location that is the same as the geographical location of geographically located storage device 500, then, if the compute request is for data only, geo-fencing policy implementation module 508 forwards the compute request to data retrieval/response module 514. Data retrieval/response module 514 gathers the requested data from data storage 504 and responds to the compute request with the requested data. If the compute request is for data and computation offloading, geo-fencing policy implementation module 508 forwards the compute request and the computational algorithm to data retrieval/response module 514. Data retrieval/response module 514 gathers the requested data from data storage 504 and responds/forwards the compute request with the requested data and the computational algorithm to the requesting client or to another identified client or computation node for analysis or computation. If the compute request is for analysis or computation utilizing embedded computational infrastructure/resources 522 of geographically located storage device 500, geo-fencing policy implementation module 508 forwards the compute request and the computational algorithm to computation implementation module 510. Computation implementation module 510 gathers the requested data from data storage 504, performs the requested analysis and/or computation utilizing the included computation algorithm and embedded computational infrastructure/resources 522 of geographically located storage device 500, and responds with the results of the analysis and/or computation to the user via data retrieval/response module 514.

If the compute request originates from a geographical location that differs from the geographical location of geographically located storage device 500, then geo-fencing policy implementation module 508 determines whether the compute request complies with the governing requirements 520 stored in data structure 516 that govern geographically located storage device 500. The governing requirements 520 may indicate that a compute request originating from a geographical location that is the same as the geographical location of geographically located storage device 500 is able to access data on geographically located storage device 500, obtain data from geographically located storage device 500 and offload the data and an included computer algorithm to another client or computation node for analysis or computation, and perform analysis or computation of the data utilizing embedded computational infrastructure/resources 522 of geographically located storage device 500. However, for a compute request originating from a geographical location that is different from the geographical location of geographically located storage device 500, the governing requirements 520 may indicate the user is only able to access data on geographically located storage device 500, the user may obtain data from geographically located storage device 500 and offload the data and an included computer algorithm to another client or computation node for analysis or computation the user may access data, or the user may perform analysis or computation of the data utilizing embedded computational infrastructure/resources 522 of geographically located storage device 500, which may include removing all traces of the computation and any results of the computation from geographically located storage device 500.

Therefore, if the compute request is for data only and the governing requirements 520 indicate that data sharing is permissible, geo-fencing policy implementation module 508 forwards the compute request to data retrieval/response module 514. Data retrieval/response module 514 gathers the requested data from data storage 504 and responds to the compute request with the requested data. If the compute request is for data only and governing requirements 520 indicate that data sharing is impermissible, geo-fencing policy implementation module 508 rejects the compute request and sends an error to the requesting user indicating insufficient permissions to use geographically located storage device 500 via data retrieval/response module 514.

If the compute request is for data and computation offloading and governing requirements 520 indicate that data sharing and computation offloading is permissible, geo-fencing policy implementation module 508 forwards the compute request and the computational algorithm to data retrieval/response module 514. Data retrieval/response module 514 gathers the requested data from data storage 504 and responds/forwards the compute request with the requested data and the computational algorithm to the requesting client or to another identified client or computation node for analysis or computation. If the compute request is for data and computation offloading and governing requirements 520 indicate that data sharing and computation offloading is impermissible, geo-fencing policy implementation module 508 rejects the compute request and sends an error to the requesting user indicating insufficient permissions to use geographically located storage device 500 via data retrieval/response module 514.

If the compute request is for analysis or computation utilizing embedded computational infrastructure/resources 522 of geographically located storage device 500 and governing requirements 520 indicate that embedded computation is permissible, geo-fencing policy implementation module 508 forwards the compute request and the computational algorithm to computation implementation module 510. Computation implementation module 510 gathers the requested data from data storage 504, performs the requested analysis and/or computation utilizing the included computation algorithm and embedded computational infrastructure/resources 522 of geographically located storage device 500, and responds with the results of the analysis and/or computation to the user via data retrieval/response module 514. If the compute request is for analysis or computation utilizing embedded computational infrastructure/resources 522 of geographically located storage device 500 and governing requirements 520 indicate that embedded computation is impermissible, geo-fencing policy implementation module 508 rejects the compute request and sends an error to the requesting user indicating insufficient permissions to use geographically located storage device 500 via data retrieval/response module 514.

As an additional component of performing embedded computation, governing requirements 520 may also indicate that for non-geographically originating compute requests, any trace of the analysis or computation performed on geographically located storage device 500 is removed such that the computation algorithm is not visible to the other geographic users, that results of the computation are hidden from all logs, and audits the storage node. That is, trace removal module 512 executes so that any residue of the compute request, the computations, or results of the computation exist on geographically located storage device 500 after the results are sent back to the requesting entity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java. Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6A:
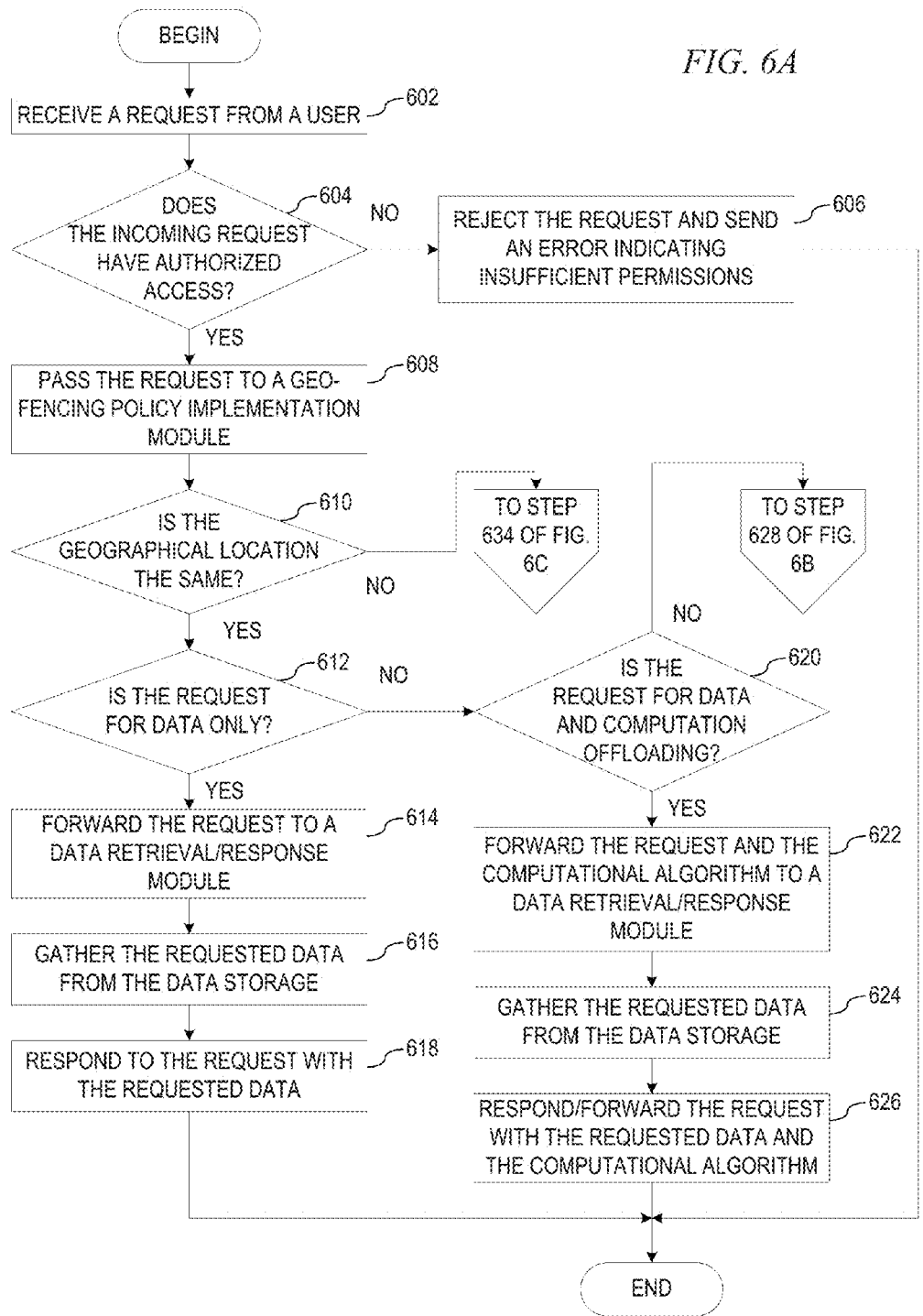
FIGS. 6A, 6B, and 6C depict the operation of enabling separation of compute infrastructure built within a storage unit in accordance with an illustrative embodiment.
Figure 6B:
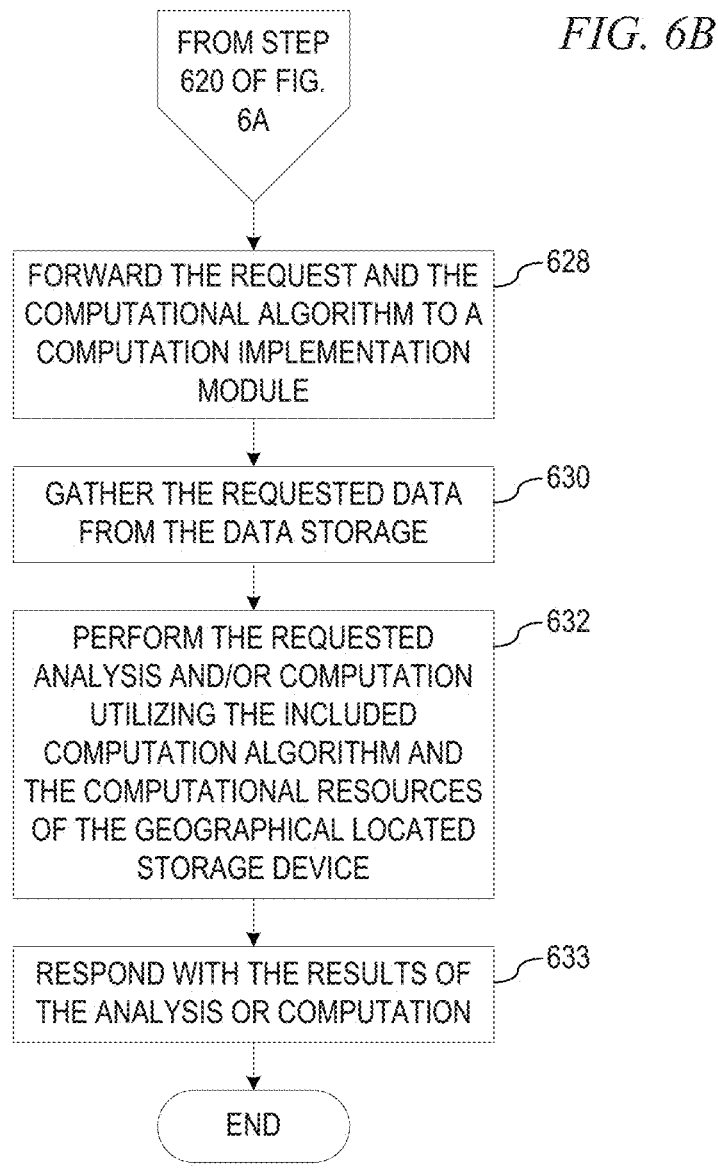
Figure 6C:
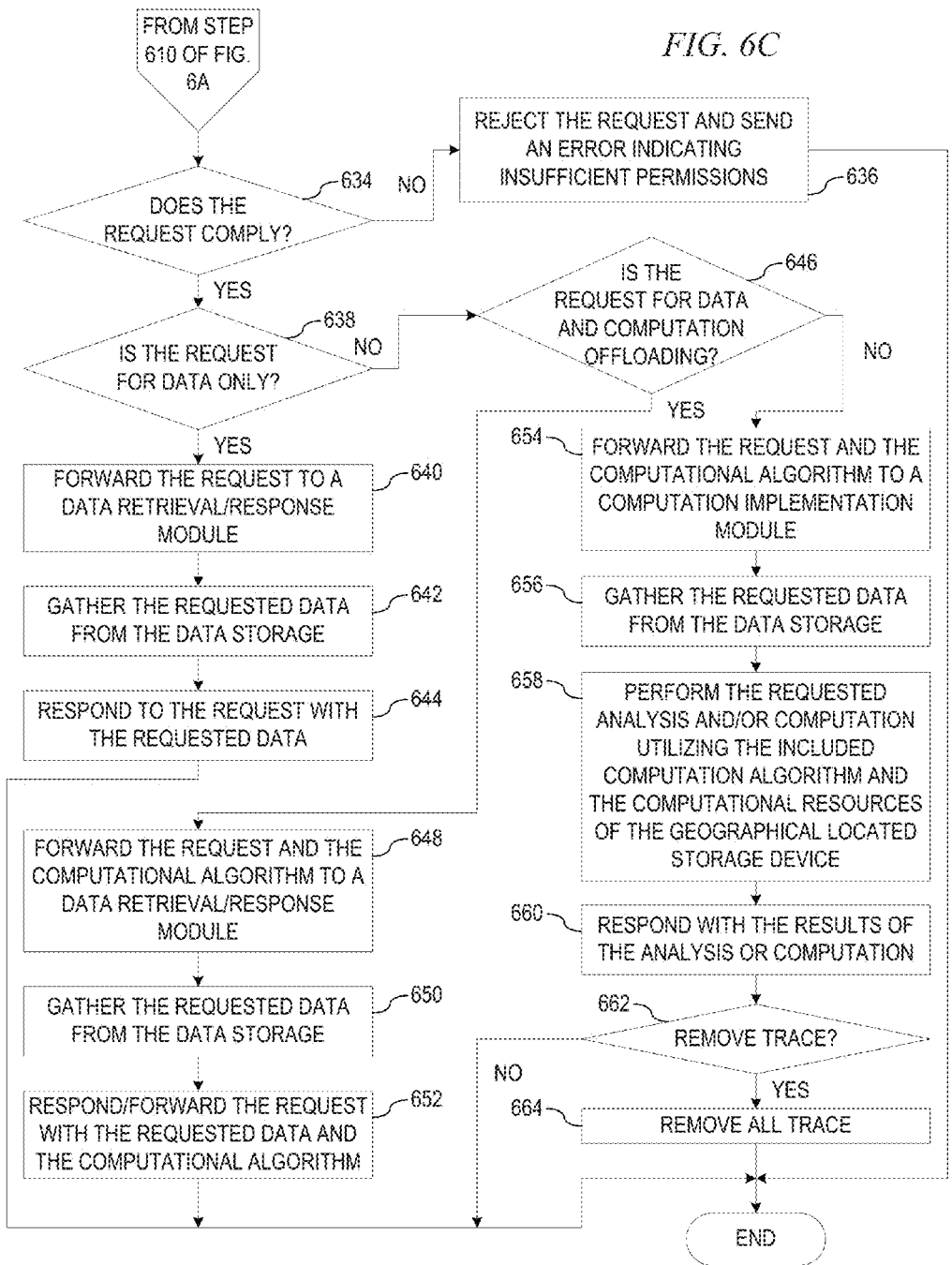

FIGS. 6A, 6B, and 6C depict the operation of enabling separation of compute infrastructure built within a geographically located storage device in accordance with an illustrative embodiment. As the operation begins, a request receiving module of a geo-fencing aware compute mechanism executed by a processor of a geographically located storage device receives a compute request from a user (step 602). In accordance with the illustrative embodiments, the compute request may originate from any client device that has access to the geographically located storage device. However, since the geographically located storage device is a storage device that is shared by two or more countries under a prearranged agreement, the request receiving module determines whether the incoming compute request is an authorized access to the geographically located storage device (step 604). In performing this check, the request receiving module compares metadata associated with the compute request that indicates geographical location (country of origin), company or enterprise, client device, user identification, or any other authorization information against a set of verified authorization information in data structure associated with the geo-fencing aware compute mechanism to ensure only those individuals who are to have access to the geographically located storage device have their compute requests processed by the geographically located storage device.

If at step 604 the request receiving module fails to authorize the incoming compute request, the request receiving module rejects the compute request and sends an error to the requesting user indicating insufficient permissions to use the geographically located storage device (step 606), with the operation terminating thereafter. If at step 604 the request receiving module authorizes the incoming compute request, the request receiving module passes the compute request to a geo-fencing policy implementation module of the geo-fencing aware compute mechanism (step 608). Upon receiving the compute request, the geo-fencing policy implementation module determines whether the geographical location information associated with the compute request is the same as the geographical location of the geographically located storage device (step 610). If at step 610 the geo-fencing policy implementation module determines that the compute request originates from a geographical location that is the same as the geographical location of the geographically located storage device, then the geo-fencing policy implementation module determines whether the compute request is for data only (step 612). If at step 612 the geo-fencing policy implementation module determines that the compute request is for data only, the geo-fencing policy implementation module forwards the compute request to a data retrieval/response module in the geo-fencing aware compute mechanism (step 614). The data retrieval/response module gathers the requested data from the data storage of the geographically located storage device (step 616) and responds to the compute request with the requested data (step 618), with the operation terminating thereafter.

If at step 612 the geo-fencing policy implementation module determines that the compute request is not for data only, then the geo-fencing policy implementation module determines whether the compute request is for data and computation offloading (step 620). If at step 620 the geo-fencing policy implementation module determines that the compute request is for data and computation offloading, the geo-fencing policy implementation module forwards the compute request and the computational algorithm to the data retrieval/response module (step 622). The data retrieval/response module gathers the requested data from the data storage (step 624) and responds/forwards the compute request with the requested data and the computational algorithm to the requesting client or to another identified client or computation node for analysis or computation (step 626), with the operation terminating thereafter.

If at step 620 the geo-fencing policy implementation module determines that the compute request is not for data and computation offloading but rather for analysis or computation utilizing embedded computational infrastructure/resources of the geographically located storage device, the geo-fencing policy implementation module forwards the compute request and the computational algorithm to a computation implementation module in the geo-fencing aware compute mechanism (step 628). The computation implementation module gathers the requested data from the data storage (step 630), performs the requested analysis and/or computation utilizing the included computation algorithm and the embedded computational infrastructure/resources of the geographically located storage device (step 632), and responds with the results of the analysis and/or computation to the user via the data retrieval/response module (step 633), with the operation terminating thereafter.

If at step 610 the geo-fencing policy implementation module determines that the compute request originates from a geographical location that is different from the geographical location of the geographically located storage device, then the geo-fencing policy implementation module determines whether the compute request complies with the governing requirements (i.e. policies, laws, agreements, or the like) that govern the geographically located storage device (step 634). As is illustrated above, the governing requirements may indicate that a compute request originating from a geographical location that is the same as the geographical location of the geographically located storage device is able to access data on the geographically located storage device, obtain data from the geographically located storage device and offload the data and an included computer algorithm to another client or computation node for analysis or computation, and perform analysis or computation of the data utilizing the embedded computational infrastructure/resources of the geographically located storage device.

However, for a compute request originating from a geographical location that is the different from the geographical location of the geographically located storage device, the governing requirements may indicate the user is only able to access data on the geographically located storage device, the user may obtain data from the geographically located storage device and offload the data and an included computer algorithm to another client or computation node for analysis or computation the user may access data, or the user may perform analysis or computation of the data utilizing the embedded computational infrastructure/resources of the geographically located storage device, which may include removing all traces of the computation and any results of the computation from the geographically located storage device.

If at step 634 the compute request fails to comply with the governing requirements and thus, is impermissible, the geo-fencing policy implementation module rejects the compute request and sends an error to the requesting user indicating insufficient permissions to use the geographically located storage device via the data retrieval/response module (step 636), with the operation terminating thereafter.

If at step 634 the compute request complies with the governing requirements is permissible, the geo-fencing policy implementation module determines whether the compute request is for data only (step 638). If at step 638 the geo-fencing policy implementation module determines that the compute request is for data only and the governing requirements indicate that data sharing is permissible, the geo-fencing policy implementation module forwards the compute request to a data retrieval/response module in the geo-fencing aware compute mechanism (step 640). The data retrieval/response module gathers the requested data from the data storage of the geographically located storage device (step 642) and responds to the compute request with the requested data (step 644), with the operation terminating thereafter.

If at step 638 the geo-fencing policy implementation module determines that the compute request is not for data only, then the geo-fencing policy implementation module determines whether the compute request is for data and computation offloading (step 646). If at step 646 the geo-fencing policy implementation module determines that the compute request is for data and computation offloading and the governing requirements indicate that data sharing and computation offloading is permissible, the geo-fencing policy implementation module forwards the compute request and the computational algorithm to the data retrieval/response module (step 648). The data retrieval/response module gathers the requested data from the data storage (step 650) and responds/forwards the compute request with the requested data and the computational algorithm to the requesting client or to another identified client or computation node for analysis or computation (step 652), with the operation terminating thereafter.

If at step 646 the geo-fencing policy implementation module determines that the compute request is not for data and computation offloading but rather for analysis or computation utilizing the embedded computational infrastructure/resources of the geographically located storage device and the governing requirements indicate that embedded computation is permissible, the geo-fencing policy implementation module forwards the compute request and the computational algorithm to a computation implementation module in the geo-fencing aware compute mechanism (step 654). The computation implementation module gathers the requested data from the data storage (step 656), performs the requested analysis and/or computation utilizing the included computation algorithm and the embedded computational infrastructure/resources of the geographically located storage device (step 658), and responds with the results of the analysis and/or computation to the user via the data retrieval/response module (step 660).

From step 660, the geo-fencing policy implementation module determines whether the governing requirements indicate that, for non-geographically originating compute requests, any trace of the analysis or computation performed on the geographically located storage device is to be removed (step 662) such that the computation algorithm is not visible to the other geographic users, that results of the computation are hidden from all logs, and audits the storage node. If at step 662, the geo-fencing policy implementation module fails to identify that all trace of the analysis or computation performed on the geographically located storage device is to be removed, the operation terminates. However, if at step 662 the geo-fencing policy implementation module identifies that all trace of the analysis or computation performed on the geographically located storage device is to be removed, the geo-fencing policy implementation module instructs a trace removal module in the geo-fencing aware compute mechanism to remove any residue of the compute request, the computations, and results of the computation exist on the geographically located storage device (step 664), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for a separation of compute infrastructure built within a storage unit that helps govern computing algorithms that extract a particular set of information from a large set of raw data on a storage node owned by a country, such that such computing algorithms to extract such information may only be executed according to the governing requirements associated with that particular country. The geo-fencing aware compute mechanism also provides hardened security through maintenance, access limitations, or the like, of the compute algorithm and common object storage compute layers as per the governing requirements, as noted by administrators or business requirements.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for enabling separation of compute infrastructure built within a geographically located storage device, the method comprising:
   determining, by a geo-fencing policy implementation module in a geo-fencing aware compute mechanism executed by a processor of the geographically located storage device, whether a compute request from a client device originates from a geographical location that is the same as a geographical location of the geographically located storage device;
   responsive to the compute request originating from a geographical location different from the geographical location of the geographically located storage device, determining, by the geo-fencing policy implementation module, whether the compute request originating from the geographical location different from the geographical location of the geographically located storage device complies with governing requirements that govern the geographically located storage device;
   responsive to the compute request originating from the geographical location different from the geographical location of the geographically located storage device complying with the requirements that govern the geographically located storage device, determining, by the geo-fencing policy implementation module, whether the compute request originating from the geographical location different from the geographical location of the geographically located storage device is for data retrieval only;
   responsive to the compute request originating from the geographical location different from the geographical location of the geographically located storage device being for data retrieval only, gathering, by a data retrieval/response module in the geo-fencing aware compute mechanism, requested data from a data storage of the geographically located storage device; and
   sending, by the data retrieval/response module, the requested data to the client device.

2. The method of claim 1, wherein the governing requirements are at least one of laws of a country where the geographically located storage device resides, or agreements between the country where the geographically located storage device resides and at least one other country.

3. The method of claim 1, further comprising:
   responsive to the compute request originating from the geographical location different from the geographical location of the geographically located storage device failing to be for data retrieval only, determining, by the geo-fencing policy implementation module, whether the compute request originating from the geographical location different from the geographical location of the geographically located storage device is for data and computation offloading;
   responsive to the compute request originating from the geographical location different from the geographical location of the geographically located storage device being for data and computation offloading, gathering, by a data retrieval/response module, the requested data from the data storage of the geographically located storage device; and
   sending, by the data retrieval/response module, the requested data and a computational algorithm included with the compute request originating from the geographical location different from the geographical location of the geographically located storage device to a computation device separate from the geographically located storage device.

4. The method of claim 3, wherein the computation device separate from the geographically located storage device is at least one of the client device, another identified client device, or a computation node.

5. The method of claim 1, further comprising:
   responsive to the compute request originating from the geographical location different from the geographical location of the geographically located storage device failing to be for data retrieval only, determining, by the geo-fencing policy implementation module, whether the compute request originating from the geographical location different from the geographical location of the geographically located storage device is for data and computation offloading;
   responsive to the compute request originating from the geographical location different from the geographical location of the geographically located storage device failing to be for data and computation offloading, recognizing, by the geo-fencing policy implementation module, that the compute request originating from the geographical location different from the geographical location of the geographically located storage device is for analysis or computation utilizing the embedded computational infrastructure of the geographically located storage device;
   gathering, by a computation implementation module in the geo-fencing aware compute mechanism, the requested data from the data storage of the geographically located storage device;
   performing, by the computation implementation module, requested analysis or computation identified in the compute request originating from the geographical location different from the geographical location of the geographically located storage device utilizing an included computation algorithm and the embedded computational infrastructure of the geographically located storage device; and
   sending, by the computation implementation module, results of the analysis or the computation to the client device.

6. The method of claim 5, further comprising:
determining, by the geo-fencing policy implementation module, whether the governing requirements indicate that, for non-geographically originating compute requests, any trace of the analysis or computation performed on the geographically located storage device is to be removed; and
responsive to the governing requirements indicating that any trace of the analysis or computation performed on the geographically located storage device is to be removed, removing, by a trace removal module in the geo-fencing aware compute mechanism, any residue of the compute request originates from the geographical location different from the geographical location of the geographically located storage device, performed computations, and results of the computation existing on the geographically located storage device.

7. The method of claim 1, wherein the compute request originating from the geographical location different from the geographical location of the geographically located storage device is received by a request receiving module in the geo-fencing aware compute mechanism that passes the compute request originating from the geographical location different from the geographical location of the geographically located storage device to the geo-fencing policy implementation module in the method comprising:
determining, by the request receiving module, whether the incoming compute request originating from the geographical location different from the geographical location of the geographically located storage device is an authorized access to the geographically located storage device by comparing metadata associated with the compute request originating from the geographical location different from the geographical location of the geographically located storage device against a set of verified authorization information; and
passing, by the request receiving module, the compute request originating from the geographical location different from the geographical location of the geographically located storage device to the geo-fencing policy implementation module in response to authenticating the compute request originating from the geographical location different from the geographical location of the geographically located storage device.

8. The method of claim 1, wherein the metadata associated with the compute request originating from the geographical location different from the geographical location of the geographically located storage device is at least one of geographical location (country of origin), company or enterprise, the client device, or user identification.

9. A computer program product comprising a computer readable storage medium having a computer readable program stored therein, wherein the computer readable program, when executed on a computing device, causes the computing device to:
determine whether a compute request from a client device originates from a geographical location that is the same as a geographical location of a geographically located storage device;
responsive to the compute request originating from a geographical location different from the geographical location of the geographically located storage device, determine whether the compute request originating from the geographical location different from the geographical location of the geographically located storage device complies with governing requirements that govern the geographically located storage device;
responsive to the compute request originating from the geographical location different from the geographical location of the geographically located storage device complying with the requirements that govern the geographically located storage device, determine whether the compute request originating from the geographical location different from the geographical location of the geographically located storage device is for data retrieval only;
responsive to the compute request originating from the geographical location different from the geographical location of the geographically located storage device being for data retrieval only, gather requested data from a data storage of the geographically located storage device; and
send the requested data to the client device.

10. The computer program product of claim 9, wherein the governing requirements are at least one of laws of a country where the geographically located storage device resides, or agreements between the country where the geographically located storage device resides and at least one other country.

11. The computer program product of claim 9, wherein the computer readable program further causes the computing device to:
responsive to the compute request originating from the geographical location different from the geographical location of the geographically located storage device failing to be for data retrieval only, determine whether the compute request originating from the geographical location different from the geographical location of the geographically located storage device is for data and computation offloading;
responsive to the compute request originating from the geographical location different from the geographical location of the geographically located storage device being for data and computation offloading, gather the requested data from the data storage of the geographically located storage device; and
send the requested data and a computational algorithm included with the compute request originating from the geographical location different from the geographical location of the geographically located storage device to a computation device separate from the geographically located storage device.

12. The computer program product of claim 11, wherein the computation device separate from the geographically located storage device is at least one of the client device, another identified client device, or a computation node.

13. The computer program product of claim 9, wherein the computer readable program further causes the computing device to:
responsive to the compute request originating from the geographical location different from the geographical location of the geographically located storage device failing to be for data retrieval only, determine whether the compute request originating from the geographical location different from the geographical location of the geographically located storage device is for data and computation offloading;
responsive to the compute request originating from the geographical location different from the geographical location of the geographically located storage device failing to be for data and computation offloading, recognize that the compute request originating from the geographical location different from the geographical location of the geographically located storage device is for analysis or computation utilizing the embedded computational infrastructure of the geographically located storage device;

gather the requested data from the data storage of the geographically located storage device;

perform requested analysis or computation identified in the compute request originating from the geographical location different from the geographical location of the geographically located storage device utilizing an included computation algorithm and the embedded computational infrastructure of the geographically located storage device; and send results of the analysis or the computation to the client device.

14. The computer program product of claim 13, wherein the computer readable program further causes the computing device to:

determine whether the governing requirements indicate that, for non-geographically originating compute requests, any trace of the analysis or computation performed on the geographically located storage device is to be removed; and responsive to the governing requirements indicating that any trace of the analysis or computation performed on the geographically located storage device is to be removed, remove any residue of the compute request originating from the geographical location different from the geographical location of the geographically located storage device, performed computations, and results of the computation existing on the geographically located storage device.

15. An apparatus comprising:

a processor; and a memory coupled to the processor, wherein the memory comprises instructions which, when executed by the processor, cause the processor to:

determine whether a compute request from a client device originates from a geographical location that is the same as a geographical location of a geographically located storage device;

responsive to the compute request originating from a geographical location different from the geographical location of the geographically located storage device, determine whether the compute request originating from the geographical location different from the geographical location of the geographically located storage device complies with governing requirements that govern the geographically located storage device;

responsive to the compute request originating from the geographical location different from the geographical location of the geographically located storage device complying with the requirements that govern the geographically located storage device, determine whether the compute request originating from the geographical location different from the geographical location of the geographically located storage device is for data retrieval only;

responsive to the compute request originating from the geographical location different from the geographical location of the geographically located storage device being for data retrieval only, gather requested data from a data storage of the geographically located storage device; and send the requested data to the client device.

16. The apparatus of claim 15, wherein the governing requirements are at lest one of laws of a country where the geographically located storage device resides, or agreements between the country where the geographically located storage device resides and at least one other country.

17. The apparatus of claim 15, wherein the instructions further cause the processor to:

responsive to the compute request originating from the geographical location different from the geographical location of the geographically located storage device failing to be for data retrieval only, determine whether the compute request originating from the geographical location different from the geographical location of the geographically located storage device is for data and computation offloading;

responsive to the compute request originating from the geographical location different from the geographical location of the geographically located storage device being for data and computation offloading, gather the requested data from the data storage of the geographically located storage device; and send the requested data and a computational algorithm included with the compute request originating from the geographical location different from the geographical location of the geographically located storage device to a computation device separate from the geographically located storage device.

18. The apparatus of claim 17, wherein the computation device separate from the geographically located storage device is at least one of the client device, another identified client device, or a computation node.

19. The apparatus of claim 15, wherein the instructions further cause the processor to:

responsive to the compute request originating from the geographical location different from the geographical location of the geographically located storage device failing to be for data retrieval only, determine whether the compute request originating from the geographical location different from the geographical location of the geographically located storage device is for data and computation offloading;

responsive to the compute request originating from the geographical location different from the geographical location of the geographically located storage device failing to be for data and computation offloading, recognize that the compute request originating from the geographical location different from thee geographical location of the geographically located storage device is for analysis or computation utilizing the embedded computational infrastructure of the geographically located storage device;

gather the requested data from the data storage of the geographically located storage device;

perform requested analysis or computation identified in the compute request originating from the geographical location different from the geographical location of the geographically located storage device utilizing an included computation algorithm and the embedded computational infrastructure of the geographically located storage device; and send results of the analysis or the computation to the client device.

20. The apparatus of claim 19, wherein the instructions further cause the processor to:

determine whether the governing requirements indicate that, for non-geographically originating compute requests, any trace of the analysis or computation performed on the geographically located storage device is to be removed; and responsive to the governing requirements indicating that any trace of the analysis or computation performed on the geographically located storage device is to be removed, remove any residue of the compute request originating from the geographical location different from the geographical location of the geographically located storage device, performed computations, and results of the computation existing on the geographically located storage device.

\* \* \* \* \*